(12) United States Patent
Priyanto et al.

(10) Patent No.: US 10,585,164 B2
(45) Date of Patent: Mar. 10, 2020

(54) FREQUENCY HOP BASED POSITIONING MEASUREMENT

(71) Applicants: SONY MOBILE COMMUNICATIONS INC., Higashi-Shinagawa, Shinagawa-ku, Tokyo (JP); SONY CORPORATION, Konan, Minato-ku, Tokyo (JP)

(72) Inventors: Basuki Priyanto, Lund (SE); Shin Horng Wong, Weybridge Surrey (GB); Martin Beale, Weybridge Surrey (GB)

( * ) Notice: Subject to any disclaimer, the term of this patent is extended or adjusted under 35 U.S.C. 154(b) by 0 days.

(21) Appl. No.: 16/320,648

(22) PCT Filed: Jul. 26, 2016

(86) PCT No.: PCT/EP2016/067812
§ 371 (c)(1),
(2) Date: Jan. 25, 2019

(87) PCT Pub. No.: WO2018/019365
PCT Pub. Date: Feb. 1, 2018

(65) Prior Publication Data
US 2019/0162817 A1    May 30, 2019

(51) Int. Cl.
*H04W 24/08* (2009.01)
*G01S 5/04* (2006.01)
(Continued)

(52) U.S. Cl.
CPC ............... *G01S 5/04* (2013.01); *G01S 5/021* (2013.01); *G01S 13/40* (2013.01); *H04B 1/713* (2013.01);
(Continued)

(58) Field of Classification Search
CPC ...... H04W 24/02; H04W 36/18; H04W 64/00; H04W 28/20; H04W 24/10; H04L 5/0048; H04L 5/0073
(Continued)

(56) References Cited

U.S. PATENT DOCUMENTS

2010/0271965 A1    10/2010 Siomina
2012/0195286 A1    8/2012 Kim
(Continued)

FOREIGN PATENT DOCUMENTS

WO    2017029213 A1    2/2017

OTHER PUBLICATIONS

International Search Report and Written Opinion from counterpart International Patent Application No. PCT/EP2016/067812 dated Apr. 7, 2017, 12 pages.
(Continued)

*Primary Examiner* — Phuoc H Doan
(74) *Attorney, Agent, or Firm* — Tucker Ellis LLP

(57) ABSTRACT

Positioning reference signals are transmitted in a downlink direction from base stations (200) of a wireless communication network to a wireless communication device (100) or in an uplink direction from the wireless communication device (100) to base stations (200) of the wireless communication network. According to a frequency hop pattern, a radio interface of the wire-less communication device is switched between multiple different frequency ranges. In this way, the wireless communication device (100) can receive the downlink positioning reference signals on multiple different frequencies defined by the frequency hop pattern or send the uplink positioning reference signals on multiple different frequencies defined by the frequency hop pattern.

20 Claims, 13 Drawing Sheets

(51) Int. Cl.
*H04L 5/00* (2006.01)
*H04W 64/00* (2009.01)
*H04B 1/713* (2011.01)
*G01S 5/02* (2010.01)
*G01S 13/40* (2006.01)
*H04B 1/7143* (2011.01)

(52) U.S. Cl.
CPC ......... *H04B 1/7143* (2013.01); *H04L 5/0048* (2013.01); *H04W 64/003* (2013.01)

(58) Field of Classification Search
USPC ................. 370/252, 330; 455/422.1, 437
See application file for complete search history.

(56) References Cited

U.S. PATENT DOCUMENTS

2014/0198680 A1    7/2014   Siomina
2019/0007923 A1*   1/2019   Blankenship ......... H04L 5/0048

OTHER PUBLICATIONS

3rd Generation Partnership Project; Technical Specification Group Radio Access Network; Evolved Universal Terrestrial Radio Access (E-UTRA); Physical channels and modulation (Release 13); 3GPP TS 36.211 V13.2.0 (Jun. 2016); 168 pages.

* cited by examiner

FREQUENCY HOP BASED POSITIONING MEASUREMENT

FIELD OF THE INVENTION

The present invention relates to methods for enabling positioning measurements for a device in a wireless communication network and to corresponding devices and systems.

BACKGROUND OF THE INVENTION

In wireless communication networks, such as a cellular network based on the LTE (Long Term Evolution) radio access technology specified by 3GPP ($3^{rd}$ Generation Partnership Project), wireless communication devices (also referred to as user equipment or "UE") can be located on the basis of positioning reference signals (PRS) transmitted in a downlink direction from base stations, referred to as eNB (evolved Node B) to the UE. The UE receives the PRS and then performs a timing difference of arrival (TDOA) measurement on the basis of the received PRS. The measurement results are transmitted from the UE to a location server, which estimates the position of the UE from the measurement results. A further possibility is to use sounding reference signals (SRS) transmitted by the UE. In this case multiple eNBs may perform TDOA measurements on the SRS transmitted by the UE. Also in this case, the measurement results may be provided to a location server, which estimates the position of the UE from the measurement results.

The PRS and the SRS are typically distributed over the entire LTE system bandwidth. The mapping of the PRS and the SRS to LTE radio resources is defined in 3GPP TS 36.211 V13.2 (2016-06). However, this wide distribution may be problematic for certain UE types which do not support the entire LTE system bandwidth, e.g., Machine Type Communications (MTC) and Narrow-band Internet of Things (NB-IoT) devices. This may for example have the effect that that only a subset of the possible PRSs or SRS can be utilized for positioning measurements and positioning accuracy is reduced.

Accordingly, there is a need for techniques that allow for efficiently enabling position measurements for a wireless communication device.

SUMMARY OF THE INVENTION

According to an embodiment, a method of enabling position measurement for a wireless communication device is provided. According to the method, a frequency hop pattern for receiving downlink (DL) positioning reference signals from base stations of a wireless communication network is configured. According to the frequency hop pattern, the wireless communication device switches a radio interface of the wireless communication device between multiple different frequency ranges to receive the DL positioning reference signals on multiple different frequencies defined by the frequency hop pattern. By combined evaluation of the received DL positioning reference signals, the wireless communication device determines positioning information for the wireless communication device. Accordingly, the DL positioning reference signals can be received on frequencies which are distributed over a wide frequency range, even if the radio interface supports only a limited bandwidth. In particular, even if the radio interface of the wireless communication device supports only a narrow bandwidth within the system bandwidth of the wireless communication network, the DL positioning reference signals may be distributed over a wider frequency range than this narrow bandwidth. This may allow for reducing the influence of frequency dependent disturbances, such as frequency selective fading. As a result, improved positioning accuracy may be achieved.

According to an embodiment, the wireless communication device configures the frequency hop pattern for the DL positioning reference signals on the basis of configuration information received from the wireless communication network. For example, the configuration information may be provided by one of the base stations. However, it is noted that in some scenarios it is also possible that the wireless communication device locally determines the frequency hop pattern and then indicates the frequency hop pattern to the wireless communication network, e.g., by transmitting corresponding configuration information to a base station of the wireless communication network. By transmitting the configuration information, the wireless communication device and the wireless communication network may configure the frequency hop pattern for the DL positioning reference signals in a flexible manner, for example taking into account current operating conditions.

According to an embodiment, the positioning information comprises a time-difference of arrival of the DL positioning reference signals from multiple different base stations. Accordingly, a low implementation effort may be achieved because the measurement results may thus be reported and evaluated in a similar manner as in existing PRS based positioning mechanisms.

According to a further embodiment, a method of enabling position measurement for a wireless communication device is provided. According to the method, a frequency hop pattern is configured. The frequency hop pattern is to be applied for switching a radio interface of the wireless communication device between multiple different frequency ranges to receive DL positioning reference signals on multiple different frequencies defined by the frequency hop pattern. A base station of the wireless communication network sends a first part of the DL positioning reference signals according to the frequency hop pattern. Further, the base station configures further base stations of the wireless communication network to send a second part of the DL positioning reference signals according to the frequency hop pattern.

According to an embodiment, the base station sends configuration information indicating the frequency hop pattern for the DL positioning reference signals to the wireless communication device. However, it is noted that in some scenarios it is also possible that the base station configures the frequency hop pattern for the DL positioning reference signals based on configuration information received from the wireless communication device. Accordingly, the wireless communication device may locally determine the frequency hop pattern for the DL positioning reference signals and then indicate the frequency hop pattern to the wireless communication network. By transmitting the configuration information, the wireless communication device and the wireless communication network may configure the frequency hop pattern for the DL positioning reference signals in a flexible manner, for example taking into account current operating conditions.

According to an embodiment, the base station sends configuration information indicating the frequency hop pattern for the DL positioning reference signals to the further base stations. By transmitting the configuration information to the further base stations, the frequency hop pattern for the DL positioning reference signals as applied by the base station and the further base stations may be configured in a flexible manner, for example taking into account current operating conditions.

According to a further embodiment, a wireless communication device is provided. The wireless communication device comprises a radio interface for connecting to a wireless communication network. Further, the wireless communication device comprises at least one processor. The at least one processor is configured to:

- configure a frequency hop pattern for receiving DL positioning reference signals from base stations of the wireless communication network;
- according to the frequency hop pattern, switch the radio interface of the wireless communication device between multiple different frequency ranges to receive the DL positioning reference signals on multiple different frequencies defined by the frequency hop pattern; and
- by combined evaluation of the received downlink positioning reference signals, determine positioning information for the wireless communication device.

The at least one processor of the wireless communication device may be configured to perform the steps of the above method. In particular, the at least one processor may be configured to configure the frequency hop pattern for the DL positioning reference signals on the basis of configuration information received from the wireless communication network. Further, the at least one processor may be configured to determine the positioning information to comprise a time-difference of arrival of the DL positioning reference signals from multiple different base stations.

According to a further embodiment, a base station for a wireless communication network is provided. The base station comprises a radio interface for connecting to a wireless communication device and a network interface for connecting to further base stations of the wireless communication network. Further, the base station comprises at least one processor. The at least one processor is configured to:

- configure a frequency hop pattern to be applied for switching a radio interface of the wireless communication device between multiple different frequency ranges to receive DL positioning reference signals on multiple different frequencies defined by the frequency hop pattern;
- via the radio interface of the base station, send a first part of the DL positioning reference signals according to the frequency hop pattern; and
- via the network interface, configure further base stations of the wireless communication network to send a second part of the DL positioning reference signals according to the frequency hop pattern.

The at least one processor of the base station may be configured to perform the steps of the above method. In particular, the at least one processor may be configured to send configuration information indicating the frequency hop pattern for the DL positioning reference signals to the wireless communication device. This may be accomplished via the radio interface. Further, the at least one processor may be configured to send configuration information indicating the frequency hop pattern for the DL positioning reference signals to the further base stations. This may be accomplished via the network interface.

According to a further embodiment, a system is provided. The system comprises a base station according to the above embodiment. Further, the system comprises the wireless communication device.

In the above embodiments of a method, wireless communication device, base station, or system, at least some of the multiple different frequencies for the DL positioning reference signals may be separated by more than a maximum bandwidth supported by the radio interface of the wireless communication device. Accordingly, frequency diversity for the DL positioning reference signals may be enhanced beyond the maximum bandwidth supported by the radio interface of the wireless communication device.

The frequency hop pattern for the DL positioning reference signals may define a first frequency hop distance which is larger than the maximum bandwidth supported by the radio interface and a second frequency hop distance which is smaller than the maximum bandwidth supported by the radio interface. In this way, the multiple different frequencies used for the DL positioning reference signals may be efficiently distributed.

The frequency hop pattern of the DL positioning reference signals may further define a repetition pattern of the DL positioning reference signals. By the repetition pattern, repeated transmissions of the DL positioning reference signal may be utilized for enhancing positioning accuracy.

The DL positioning reference signals transmitted by different base stations may be multiplexed on the basis of a multiplexing scheme comprising one or more of frequency division multiplexing, time division multiplexing, and code division multiplexing. In this way, available radio resources may be utilized in an efficient manner. In some embodiments, a frequency granularity for frequency division multiplexing of the DL positioning reference signals transmitted by different base stations may be finer than a frequency granularity for frequency division multiplexing of wireless communication signals transmitted between the wireless communication device and the wireless communication network. In this way, available radio resources may be utilized in an efficient manner for transmission of the DL positioning reference signals.

According to a further embodiment, a method of enabling position measurement for a wireless communication device is provided. According to the method, a frequency hop pattern for sending uplink (UL) positioning reference signals from the wireless communication device is configured. According to the frequency hop pattern, the wireless communication device switches a radio interface of the wireless communication device between multiple different frequency ranges to send the UL positioning reference signals on multiple different frequencies defined by the frequency hop pattern. Accordingly, the UL positioning reference signals can be sent on frequencies which are distributed over a wide frequency range, even if the radio interface supports only a limited bandwidth. This may allow for reducing the influence of frequency dependent disturbances, such as frequency selective fading. As a result, improved positioning accuracy may be achieved.

According to an embodiment, the wireless communication device configures the frequency hop pattern for the UL positioning reference signals on the basis of configuration information received from the wireless communication network. For example, the configuration information may be provided by one of the base stations. However, it is noted that in some scenarios, it is also possible that the wireless communication device locally determines the frequency hop pattern for the UL positioning reference signals and then indicates the frequency hop pattern to the wireless communication network, e.g., by transmitting corresponding configuration information to a base station of the wireless communication network. By transmitting the configuration information, the wireless communication device and the wireless communication network may configure the frequency hop pattern for the UL positioning reference signals in a flexible manner, for example taking into account current operating conditions.

According to a further embodiment, a method of enabling position measurement for a wireless communication device is provided. According to the method a frequency hop pattern is configured. The frequency hop pattern is to be applied for switching a radio interface of the wireless communication device between multiple different frequency ranges to send UL positioning reference signals on multiple different frequencies defined by the frequency hop pattern. A base station of the wireless communication network receives the UL positioning reference signals. Further, the base station configures further base stations of the wireless communication network to receive the UL positioning reference signals and provide information derived from the received UL positioning reference signals to the base station. By combined evaluation of the received UL positioning reference signals and the information provided by the further base stations, the determines positioning information for the wireless communication device.

According to an embodiment, the base station sends configuration information indicating the frequency hop pattern for the UL positioning reference signals to the wireless communication device. However, it is noted that in some scenarios it is also possible that the base station configures the frequency hop pattern for the UL positioning reference signals based on configuration information received from the wireless communication device. Accordingly, the wireless communication device may locally determine the frequency hop pattern for the UL positioning reference signals and then indicate the frequency hop pattern to the wireless communication network. By transmitting the configuration information, the wireless communication device and the wireless communication network may configure the frequency hop pattern for the UL positioning reference signals in a flexible manner, for example taking into account current operating conditions.

According to an embodiment, the base station sends configuration information indicating the frequency hop pattern for the UL positioning reference signals to the further base stations. By transmitting the configuration information to the further base stations, the frequency hop pattern for the UL positioning reference signals as applied by the base station and the further base stations may be configured in a flexible manner, for example taking into account current operating conditions.

According to an embodiment, the positioning information comprises a time-difference of arrival of the UL positioning reference signals at multiple different base stations. Accordingly, a low implementation effort may be achieved because the measurement results may thus be reported and evaluated in a similar manner as in existing SRS based positioning mechanisms.

According to a further embodiment, a wireless communication device is provided. The wireless communication device comprises a radio interface for connecting to a wireless communication network. Further, the wireless communication device comprises at least one processor. The at least one processor is configured to:

configure a frequency hop pattern for sending UL positioning reference signals from the wireless communication device; and according to the frequency hop pattern, switch the radio interface of the wireless communication device between multiple different frequency ranges to send the UL positioning reference signals on multiple different frequencies defined by the frequency hop pattern.

The at least one processor of the wireless communication device may be configured to perform the steps of the above method. In particular, the at least one processor may be configured to configure the frequency hop pattern for the UL positioning reference signals on the basis of configuration information received from the wireless communication network.

According to a further embodiment, a base station for a wireless communication network is provided. The base station comprises a radio interface for connecting to a wireless communication device and a network interface for connecting to further base stations of the wireless communication network. Further, the base station comprises at least one processor. The at least one processor is configured to:

configure a frequency hop pattern to be applied for switching a radio interface of the wireless communication device between multiple different frequency ranges to send UL positioning reference signals on multiple different frequencies defined by the frequency hop pattern;

via the radio interface of the base station, receive the UL positioning reference signals;

via the network interface, configure further base stations of the wireless communication network to receive the UL positioning reference signals and provide information derived from the received uplink positioning reference signals to the base station; and by combined evaluation of the received UL positioning reference signals and the information provided by the further base stations, determine positioning information for the wireless communication device.

The at least one processor may be configured to perform the steps of the above method. In particular, the at least one processor may be configured to send configuration information indicating the frequency hop pattern for the UL positioning reference signals to the wireless communication device. This may be accomplished via the radio interface. Further, the at least one processor may be configured to send configuration information indicating the frequency hop pattern for the UL positioning reference signals to the further base stations. This may be accomplished via the network interface.

According to a further embodiment, a system is provided. The system comprises a base station according to the above embodiment. Further, the system comprises the wireless communication device.

In the above embodiments of a method, wireless communication device, base station, or system, at least some of the multiple different frequencies for the UL positioning reference signals may be separated by more than a maximum bandwidth supported by the radio interface of the wireless communication device. Accordingly, frequency diversity for the UL positioning reference signals may be enhanced beyond the maximum bandwidth supported by the radio interface of the wireless communication device.

The frequency hop pattern for the UL positioning reference signals may define a first frequency hop distance which is larger than the maximum bandwidth supported by the radio interface and a second frequency hop distance which is smaller than the maximum bandwidth supported by the radio interface. In this way, the multiple different frequencies used for the UL positioning reference signals may be efficiently distributed.

The frequency hop pattern the UL positioning reference signals may further define a repetition pattern of the UL positioning reference signals. By the repetition pattern, repeated transmissions of the UL positioning reference signal may be utilized for enhancing positioning accuracy.

The UL positioning reference signals transmitted by different wireless communication devices may be multiplexed on the basis of a multiplexing scheme comprising one or more of frequency division multiplexing, time division multiplexing, and code division multiplexing. In this way, available radio resources may be utilized in an efficient manner. In some embodiments, a frequency granularity for frequency division multiplexing of the UL positioning reference signals transmitted by different wireless communication devices may be finer than a frequency granularity for frequency division multiplexing of wireless communication signals transmitted between the wireless communication device and the wireless communication network. In this way, available radio resources may be utilized in an efficient manner for transmission of the UL positioning reference signals.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to enabling positioning measurements for a wireless communication device, in the following also referred to as "UE". The positioning measurements are based on DL positioning reference signals transmitted by base stations of the wireless communication network and/or on UL positioning reference signals transmitted by the UE. In order to address the limitations of a radio interface of the UE, e.g., a bandwidth limitation, transmission and reception of the DL positioning reference signals or UL positioning reference signals is based on a frequency hop pattern which defines multiple different frequencies. Using this frequency hop pattern, the UE switches its radio interface between multiple frequency ranges. In this way, the UE can receive the DL positioning reference signals on multiple different frequencies which are not limited by a maximum bandwidth supported by the radio interface or send the UL positioning reference signals on multiple different frequencies which are not limited by the maximum bandwidth supported by the radio interface. As a result, frequency diversity for the DL positioning reference signals or for UL positioning reference signals can be enhanced and positioning accuracy improved.

Figure 1:
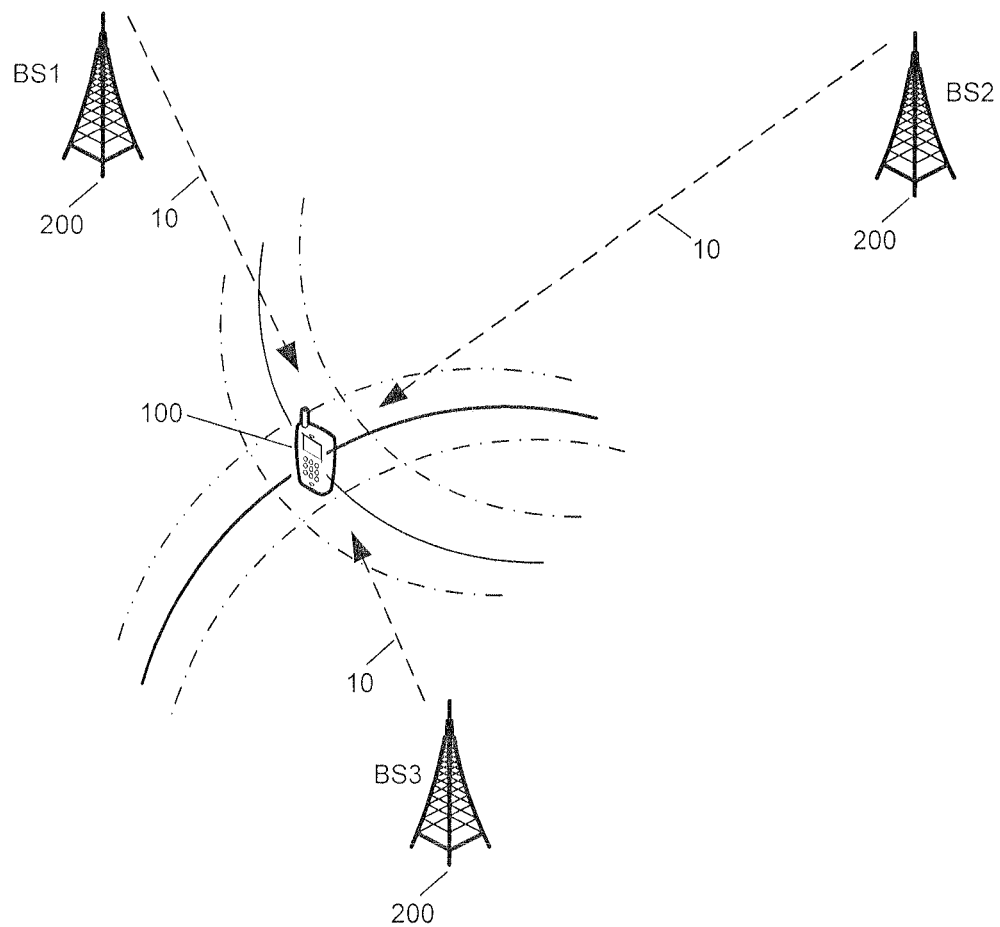
FIG. 1 schematically illustrates positioning measurements based on DL positioning reference signals according to an embodiment of the invention.

FIG. 1 schematically illustrates positioning measurements for a UE 100 which are based on DL positioning reference signals 10 transmitted by different base stations 200 of the wireless communication network. One of the base stations 200, e.g., the base station designated with "BS1", is assumed to be a serving base station of the UE 100. Via the serving base station 200, the UE 100 is connected to the wireless communication network. The other base stations 200 are assumed to be neighboring base stations.

As illustrated, each of the base stations 200 transmits DL positioning reference signals 10. The DL positioning reference signals 10 transmitted by the different base stations 200 may be multiplexed using frequency division multiplexing, time division multiplexing, and/or code division multiplexing. The DL positioning reference signals 10 can be based on differential operations between two training symbols and may be generated based on a Zadoff-Chu sequence. The DL positioning reference signals 10 may be broadcast signals which can be received by every UE within the coverage region of the base station 200. However, it is also conceivable to utilize UE-specific DL positioning reference signals.

The UE 100 receives the DL positioning reference signals 10 and evaluates the received DL positioning reference signals 10. For example, the UE 100 may perform cross-correlation of the received DL positioning reference signals 10 with locally generated signals and thereby estimate propagation delays for the DL positioning reference signals 10. This may also involve averaging and/or correlating multiple transmissions of the DL positioning reference signals 10 from the same base station 200. The UE 100 may, additionally or alternatively, also utilize a PDP (Power Delay Profile) for estimating the propagation delays of the DL positioning reference signals 10. From the propagation delays, or the cross correlations, of the DL positioning reference signals 10 from the different base stations 200 the UE 10 may then obtain RSTD (Reference Signal Time Difference) values, e.g., by subtracting the propagation delay obtained for each of the neighboring base stations 200 from the propagation delay obtained for the serving base station 200.

The UE 100 then reports the measurements, e.g., the obtained RSTD values, as positioning information to a location server (not illustrated). This may also involve reporting measurement quality. The location server may then further evaluate the reported measurements to determine the position of the UE 100, e.g., in terms of geographical coordinates. This may for example be based on triangulation and/or trilateration calculations.

As mentioned above, the transmission of the DL positioning reference signals 10 is based on a frequency hop pattern. The frequency hop pattern can be configured by the wireless communication network. The frequency hop pattern can be base station specific, cell specific, or UE specific. Accordingly, each base station 200 changes the frequency (f) where it transmits its DL positioning reference signals 10 depending on the time (t). In other words, at a first time, the base station 200 transmits its DL positioning reference signals 10 on a first frequency, while at a second time the base station 200 transmits its DL positioning reference signals 10 on a second frequency which is different from the first frequency. An example of a corresponding frequency hop pattern is illustrated in FIG. 2.

Figure 2:
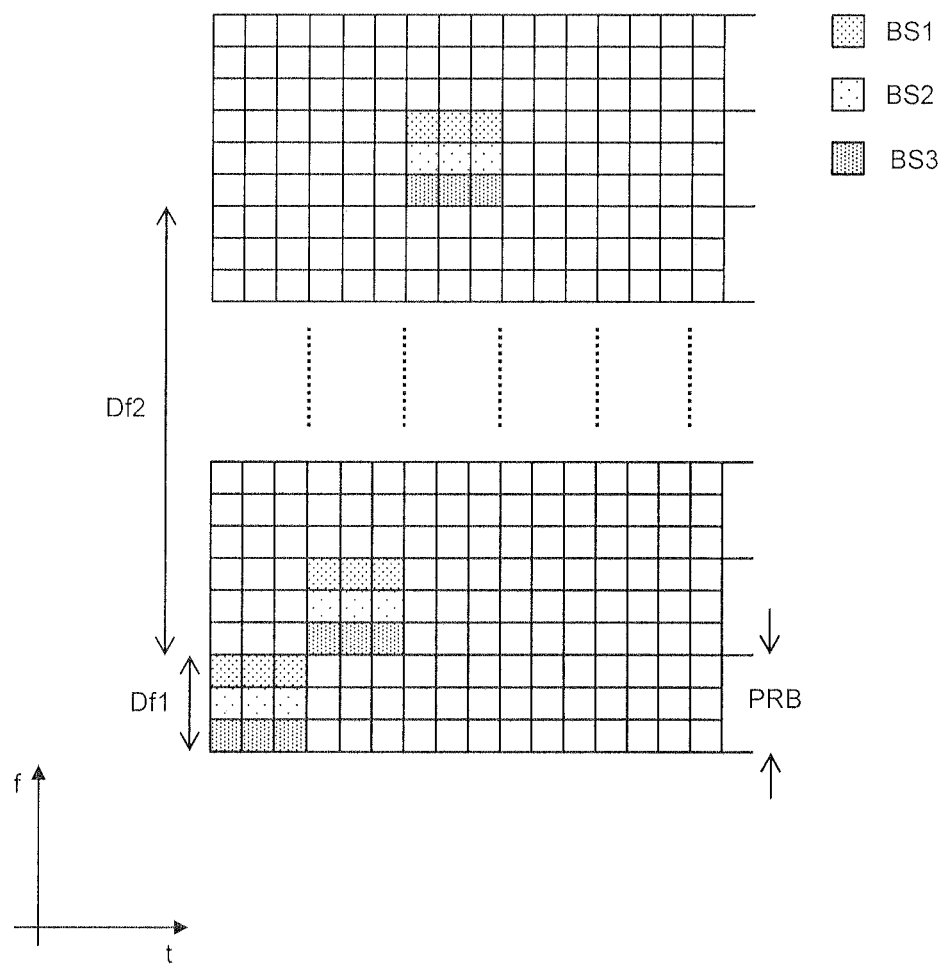
FIG. 2 schematically illustrates a frequency hop pattern for DL positioning reference signals according to an embodiment of the invention.

In the example of FIG. 2, the positions where the DL positioning reference signals 10 are transmitted are shown in terms of positions in a time-frequency grid as used for allocation of radio resources for wireless communication in the wireless communication network. The time-frequency grid may for example be organized in physical resource blocks (PRBs). When utilizing the LTE radio access technology, each PRB may correspond to 12 sub-carriers in the frequency domain. However, other ways of organizing the time-frequency grid or other PRB sizes could be utilized as well. The radio interface of the UE 100 may support only a maximum bandwidth which is smaller than the system bandwidth of the wireless communication network, i.e., a maximum bandwidth supported for multi-frequency modulation, such as OFDM. For example, the maximum bandwidth supported by the radio interface may correspond to a narrowband frequency range as used for MTC or NB-IoT communication. The narrowband frequency range may for example correspond to six PRBs in the frequency domain (e.g., if the UE is of MTC type) or to one PRB in the frequency domain (e.g., if the UE is of NB-IoT type).

As further illustrated in FIG. 2, the DL positioning reference signals 10 of different base stations 200 (BS1, BS2, and BS3) are multiplexed by frequency division multiplexing, i.e., transmitted on different frequencies. In addition as an alternative, also time division multiplexing or code division multiplexing could be utilized.

In the example of FIG. 2, the frequency hop pattern is based on a first frequency hop distance Df1 and a second frequency hop distance Df2. The first frequency hop distance Df1 is a small frequency hop distance, e.g., smaller than the maximum bandwidth supported by the radio interface. The second frequency hop distance Df2 is a large frequency hop distance, e.g., larger than the maximum bandwidth supported by the radio interface, e.g., spaced apart by one or more narrowband frequency ranges. The first frequency hop distance Df1 may be used for performing coarse positioning measurements, while the second frequency hop distance Df2 may be used for performing fine positioning measurements. A further benefit of the large frequency hop distance Df2 is that it provides robustness against frequency selective fading (which might for example occur within a frequency range corresponding to the small frequency hop distance Df1). As shown in FIG. 2, the first frequency hop distance Df1 can be one PRB (e.g., 12 sub-carriers), while the second frequency hop distance Df2 can be six PRBs or larger. Accordingly, the first frequency hop distance Df1 can be used for performing a frequency hop within the narrowband frequency range, whereas the second frequency hop distance Df2 can be used for performing a frequency hop to outside the narrowband frequency range or to another narrowband frequency range. Since the frequency hop pattern is utilized for switching the radio interface between different frequency ranges, changing the frequency of the DL positioning reference signals 10 is not limited by the maximum bandwidth supported by the radio interface and frequency diversity of the DL positioning reference signals is enhanced beyond the narrowband frequency range. In this way, positioning accuracy can be improved.

As can be seen, the frequency hop pattern may be applied for offsetting a frequency division multiplexing pattern according to which the DL positioning reference signals from the different base stations are multiplexed. In this respect, it is noted that such frequency division multiplexing pattern may also differ from the example as illustrated in FIG. 2. Further, such offsetting could also be applied with respect to a multiplexing pattern combing frequency division and time division multiplexing, e.g., with respect to individual resource elements or groups of resource elements.

Figure 3:
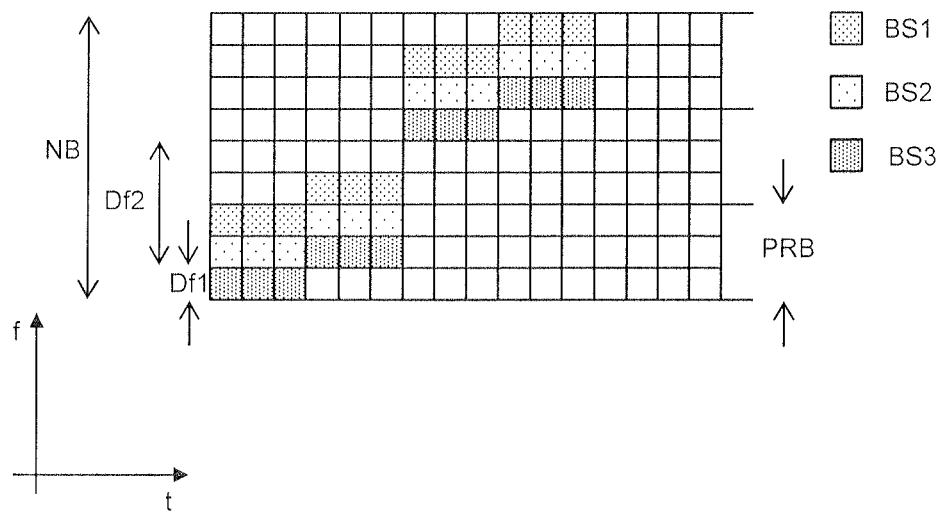
FIG. 3 schematically illustrates a further frequency hop pattern for DL positioning reference signals according to an embodiment of the invention.

It is noted that the two different frequency hop distances as explained in the example of FIG. 2 are merely exemplary, and that it would also be possible to utilize only one frequency hop distance or more than two frequency hop distances. In some scenarios, one or more frequency hop distances can also be defined in such a way that the frequency hop pattern defines frequencies which are within the same narrowband frequency range. A corresponding example is illustrated in FIG. 3. While this may provide less frequency diversity than in the example of FIG. 2, it may be beneficial if the radio interface of the UE 100 is limited to a specific narrowband frequency range. In the example of FIG. 3, both the first frequency hop distance Df1 and the second frequency hop distance Df2 are smaller than the maximum bandwidth supported by the radio interface.

The frequency hop pattern may also define a repetition of the DL positioning reference signals 10. For example, before a frequency hop, the DL positioning reference signals 10 can be repeated Y times. If wireless communication in the wireless communication network is organized in subframes (like for example in the LTE radio access technology), the repetitions can be defined by defining that for Y subframes the DL positioning reference signals 10 are repeated on the same frequency before performing a frequency hop. After the frequency hop, the DL positioning reference signals may be repeated for Y subframes (or another number of subframes) on another frequency. If the frequency hop pattern defines multiple different hop distances, such as the above-mentioned frequency hop distances Df1 and Df2, the number of repetitions can also be defined individually per frequency hop distance. For example, a subpattern based on the first frequency hop distance Df1 could be repeated Z times before a frequency hop of the second frequency hop distance Df2.

It is noted that the frequency hop pattern on the one hand provides the UE 100 with information on which frequency the DL positioning reference signals 10 can be received at a given time. The UE 100 may then tune its radio interface accordingly. On the other hand, the frequency hop pattern provides the base stations 200 with information on which frequency the DL positioning reference 10 signals should be transmitted at a given time. The serving base station 200 of the UE 100 may configure the neighboring base stations 200 accordingly, e.g., by sending corresponding configuration information. However, since radio interfaces of the base stations 200 typically need to support simultaneous transmissions over the entire system bandwidth of the wireless communication system, the base stations 200 may also transmit the DL positioning reference signals 10 on all frequencies defined by the frequency hop pattern. These frequencies may be distributed over the entire system bandwidth or over a subrange of the entire system bandwidth, e.g., one or more narrowband frequency ranges within the system bandwidth, which are assigned to be used by MTC type or NB-IoT type devices. This may facilitate configuration of the base stations 200, in particular when considering scenarios where different frequency hop patterns, e.g., defined in a UE specific manner, need to be supported at the same time.

It is noted that the allocation of radio resources for transmission of the DL positioning reference signals 10 as shown in FIGS. 2 and 3 is merely exemplary. The allocation of radio resources for transmission of the DL positioning reference signals 10 may be configured in various ways. This may be accomplished in a UE specific manner. Further, the allocation may also be reconfigured in a dynamic manner, e.g., to meet accuracy requirements for the positioning measurements based on the DL positioning reference signals 10.

Figure 4:
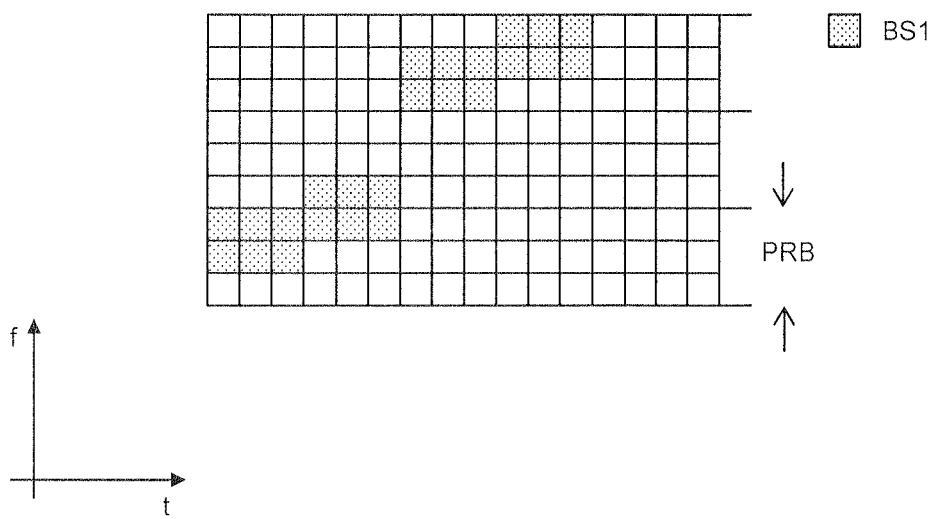
FIG. 4 schematically illustrates a further frequency hop pattern for DL positioning reference signals according to an embodiment of the invention.

For example, in some scenarios more radio resources may be allocated for transmission of the DL positioning reference signals 10 by transmitting the DL positioning reference signals 10 of a certain base station 200 over a larger frequency range, e.g., on more subcarriers. An example of a corresponding frequency hop pattern is illustrated in FIG. 4. As illustrated in FIG. 4, the frequency hop pattern for the base station BS1 is similar as in the example of FIG. 3, but additional radio resources on other frequencies are used for transmission of the DL positioning reference signals 10.

Figure 5:
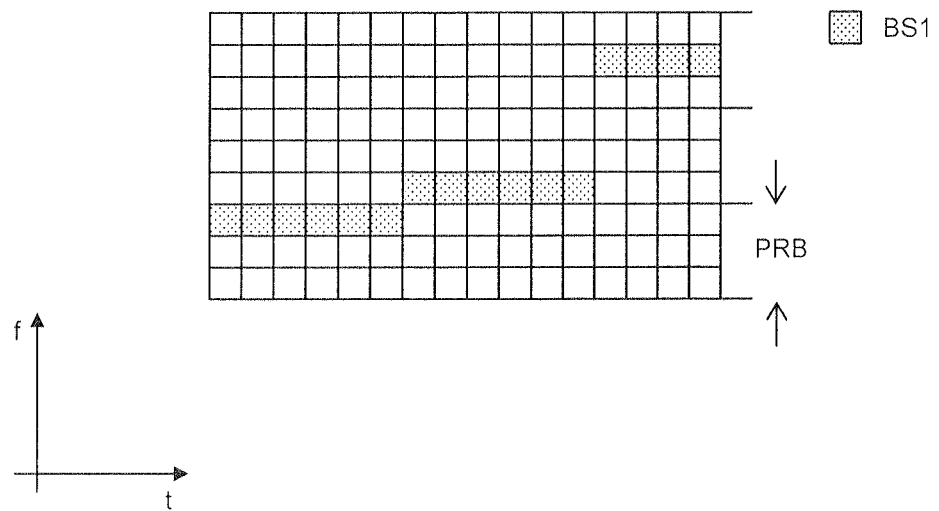
FIG. 5 schematically illustrates a further frequency hop pattern for DL positioning reference signals according to an embodiment of the invention.

According to a further example, in some scenarios more radio resources may be allocated for transmission of the DL positioning reference signals 10 by transmitting the DL positioning reference signals 10 of a certain base station 200 over a longer time interval, e.g., on more modulation symbols or in more subframes. An example of a corresponding frequency hop pattern is illustrated in FIG. 5. As illustrated in FIG. 5, the frequency hop pattern for the base station BS1 is similar as in the example of FIG. 3, but additional radio resources in other time slots are used for transmission of the DL positioning reference signals 10. The additional time domain radio resources may be used for repetitive transmission of the UL positioning reference signal, e.g., according to a repetition pattern as mentioned above. Alternatively or in addition, the additional time domain radio resources may be used for transmitting the UL positioning reference signals on the basis of a longer symbol sequence.

Figure 6:
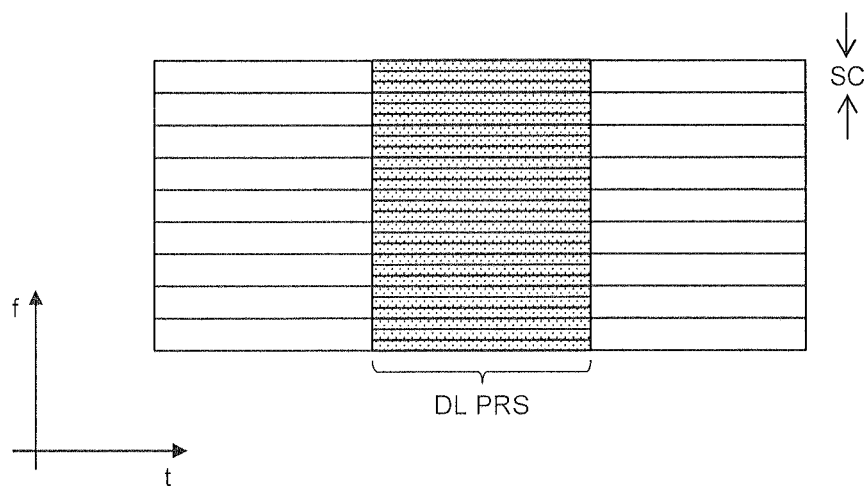
FIG. 6 schematically illustrates frequency division multiplexing for DL positioning reference signals according to an embodiment of the invention.

As mentioned above, frequency division multiplexing may be used for transmission of the DL positioning reference signals 10 of the different base stations. This frequency division multiplexing may be based on the same frequency granularity as used for multi-frequency modulation (e.g., OFDM) of wireless communication signals transmitted between the UE 100 and the base stations 200. By way of example, in the LTE radio access technology this frequency granularity would be defined by a subcarrier spacing of 15 kHz. In some scenarios, frequency division multiplexing of the DL positioning reference signals 10 may be based on a finer frequency granularity than the frequency granularity as used for multi-frequency modulation of the wireless communication signals. In this way, efficiency of frequency usage may be improved. An example of utilizing a finer frequency granularity for frequency division multiplexing of the DL positioning reference signals 10 is illustrated in FIG. 6. In FIG. 6, SC denotes a spacing of subcarriers as utilized for multi-frequency modulation of the wireless communication signals. For example, this may correspond to the 15 kHz subcarrier spacing as used for OFDM in the LTE radio access technology. As further illustrated, when transmitting the DL positioning reference signals 10, a finer frequency granularity, e.g., of less than 15 kHz, such as 3.75 kHz, is used for frequency division multiplexing of the DL positioning reference signals 10 of different base stations 200. The UE 100 and the base stations 200 may switch to this finer frequency granularity in time intervals used for transmission of the DL positioning reference signals 10.

Figure 7:
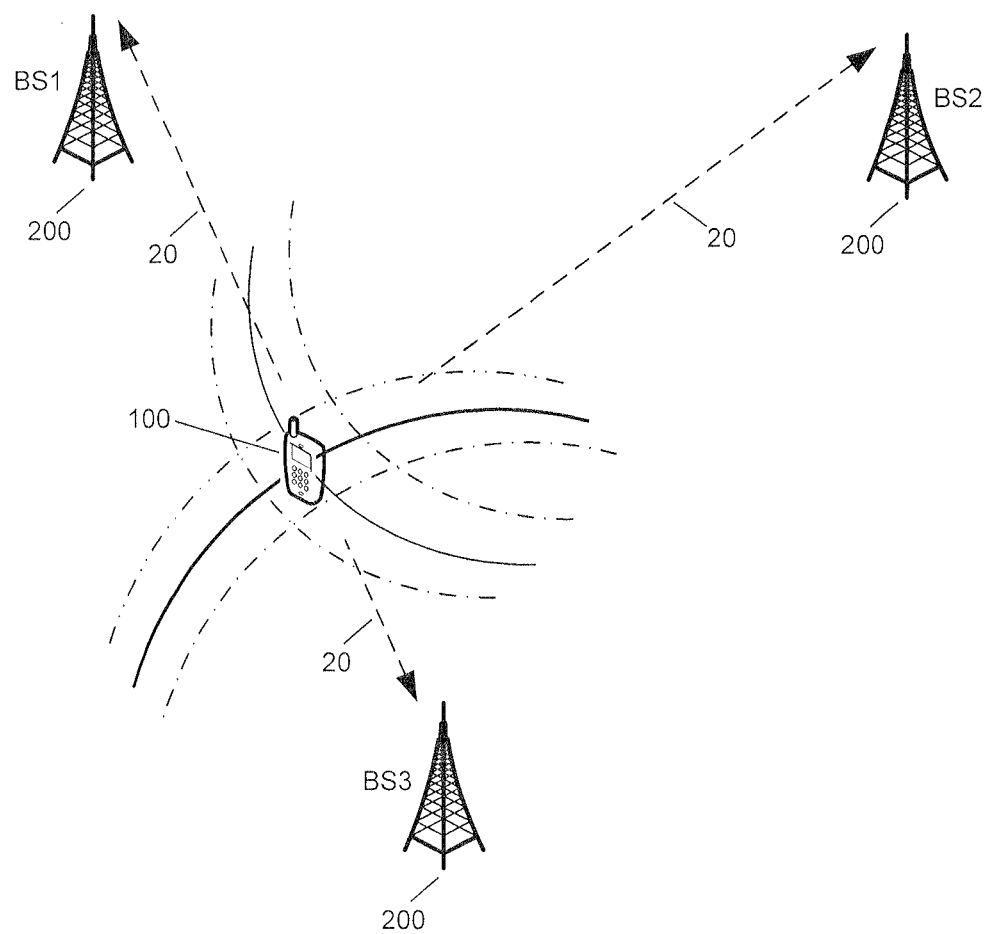
FIG. 7 schematically illustrates positioning measurements based on UL positioning reference signals according to an embodiment of the invention.

FIG. 7 schematically illustrates positioning measurements for a UE 100 which are based on UL positioning reference signals 20 transmitted by the UE 100 and received by different base stations 200 of the wireless communication network. One of the base stations 200, e.g., the base station designated with "BS1", is assumed to be a serving base station of the UE 100. Via the serving base station 200, the UE 100 is connected to the wireless communication network. The other base stations 200 are assumed to be neighboring base stations.

As illustrated, the UE 100 transmits UL positioning reference signals 20 which are received by the base stations 200. In a similar manner, UL positioning reference signals may be transmitted by other UEs (not illustrated). The UL positioning reference signals 20 transmitted by different UEs may be multiplexed using frequency division multiplexing, time division multiplexing, and/or code division multiplexing. The UL positioning reference signals 20 can be based on differential operations between two training symbols and may be generated based on a Zadoff-Chu sequence. The UL positioning reference signals 20 may be UE-specific.

The base stations 200 receive the UL positioning reference signals 20 and evaluate the received UL positioning reference signals 20. For example, each base station 200 may perform cross-correlation of the received UL positioning reference signals with locally generated signals and thereby estimate propagation delays for the UL positioning reference signals 20. This may also involve averaging and/or correlating multiple transmissions of the UL positioning reference signals 20. The UL positioning reference signals 20 may be received via different antennas of the same base station 200, and the propagation delay may be estimated based on the UL positioning reference signals 20 received via the different antennas of the same base station 200. Further, it is possible to utilize a PDP for estimating the propagation delays of the UL positioning reference signals 20. The serving base station 200 collects the estimated propagation delays from the neighboring base stations 200. For example, the serving base station 200 may configure the neighboring base stations 200 to perform the measurements on the UL positioning reference signals 20 transmitted by the UE 100 and to report results of these measurements to the serving base station 200.

From the propagation delays of the UL positioning reference signals 20 received by the different base stations 200, the serving base station 200 may then obtain RSTD values, e.g., by subtracting the propagation delay reported by each of the neighboring base stations 200 from the propagation delay estimated by the serving base station 200. The serving base station 200 then reports the measurements, e.g., the obtained RSTD values, to a location server (not illustrated). This may also involve reporting measurement quality. The location server may then further evaluate the reported measurements to determine the position of the UE 100, e.g., in terms of geographical coordinates. This may for example be based on triangulation and/or trilateration calculations.

As mentioned above, the transmission of the UL positioning reference signals 20 is based on a frequency hop pattern. The frequency hop pattern can be configured by the wireless communication network. The frequency hop pattern can be base station specific, cell specific, or UE specific. Accordingly, the UE 100 changes the frequency (f) where it transmits the UL positioning reference signals 20 depending on the time (t). In other words, at a first time, the UE 100 transmits the UL positioning reference signals 20 on a first frequency, while at a second time the UE 100 transmits the UL positioning reference signals 20 on a second frequency which is different from the first frequency. An example of a corresponding frequency hop pattern is illustrated in FIG. 8.

Figure 8:
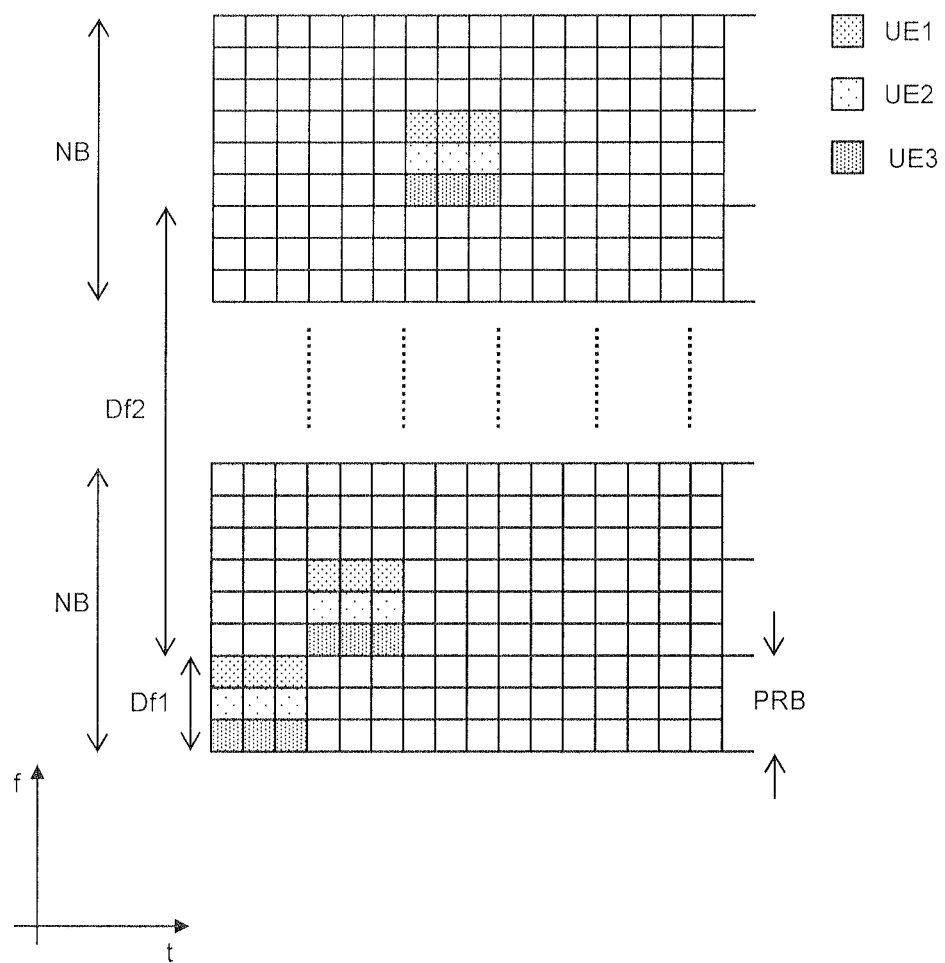
FIG. 8 schematically illustrates a frequency hop pattern for UL positioning reference signals according to an embodiment of the invention.

In the example of FIG. 8, the positions where the UL positioning reference signals 20 are transmitted are shown in terms of positions in a time-frequency grid as used for allocation of radio resources for wireless communication in the wireless communication network. The time-frequency grid may for example be organized in physical resource blocks (PRBs). When utilizing the LTE radio access technology, each PRB may correspond to 12 subcarriers in the frequency domain. However, other ways of organizing the time-frequency grid other PRB sizes could be utilized as well. The radio interface of the UE 100 may support only a maximum bandwidth which is smaller than the system bandwidth of the wireless communication network, i.e., a maximum bandwidth supported for multi-frequency modulation, such as OFDM or SC-FDMA (Single Carrier Frequency Division Multiple Access). For example, the maximum bandwidth supported by the radio interface may correspond to a narrowband frequency range as used for MTC for NB-IoT communication. The narrowband frequency range may for example correspond to six PRBs in the frequency domain (e.g., if the UE is of MTC type) or to one PRB in the frequency domain (e.g., if the UE is of NB-IoT type).

As further illustrated in FIG. 8, the UL positioning reference signals 20 of different UEs (UE1, UE2, and UE3) are multiplexed by frequency division multiplexing, i.e., transmitted on different frequencies. In addition as an alternative, also time division multiplexing or code division multiplexing could be utilized. The UL positioning reference signals 20 from a given UE may be transmitted on multiple subcarriers, e.g., spanning a PRB (12 subcarriers). However, in some scenarios a UE, e.g., the UE 100, could also send the UL positioning reference signals using a single tone transmission (e.g., on a single 15 kHz subcarrier). Single tone transmissions have a lower peak to average power ratio than multi-tone transmissions and are hence more energy efficient than multi-tone transmissions. Some UEs may only support single-tone transmissions due to hardware limitations.

In the example of FIG. 8, the frequency hop pattern is based on a first frequency hop distance Df1 and a second frequency hop distance Df2. The first frequency hop distance Df1 is a small frequency hop distance, e.g., smaller than the maximum bandwidth supported by the radio interface. The second frequency hop distance Df2 is a large frequency hop distance, e.g., larger than the maximum bandwidth supported by the radio interface, e.g., spaced apart by one or more narrowband frequency ranges. A further benefit of the large frequency hop distance Df2 is that it pro-vides robustness against frequency selective fading (which might for ex-ample occur within a frequency range corresponding to the small frequency hop distance Df1). The first frequency hop distance Df1 may be used for performing coarse positioning measurements, while the second frequency hop distance Df2 may be used for performing fine positioning measurements. As shown in FIG. 8, the first frequency hop distance Df1 can be one PRB (e.g., 12 sub-carriers), while the second frequency hop distance Df2 can be six PRBs or larger. Accordingly, the first frequency hop distance Df1 can be used for performing a frequency hop within the narrowband frequency range, whereas the second frequency hop distance Df2 can be used for performing a frequency hop to outside the narrowband frequency range or to another narrowband frequency range. Since the frequency hop pattern is utilized for switching the radio interface between different frequency ranges, changing the frequency of the UL positioning reference signals 20 is not limited by the maximum bandwidth supported by the radio interface and frequency diversity of the UL positioning reference signals is enhanced beyond the narrowband frequency range. In this way, positioning accuracy can be improved.

As can be seen, the frequency hop pattern may be applied for offsetting a frequency division multiplexing pattern according to which the UL positioning reference signals from the different UEs are multiplexed. In this respect, it is noted that such frequency division multiplexing pattern may also differ from the example as illustrated in FIG. 8. Further, such offsetting could also be applied with respect to a multiplexing pattern combing frequency division and time division multiplexing, e.g., with respect to individual resource elements or groups of resource elements.

Figure 9:
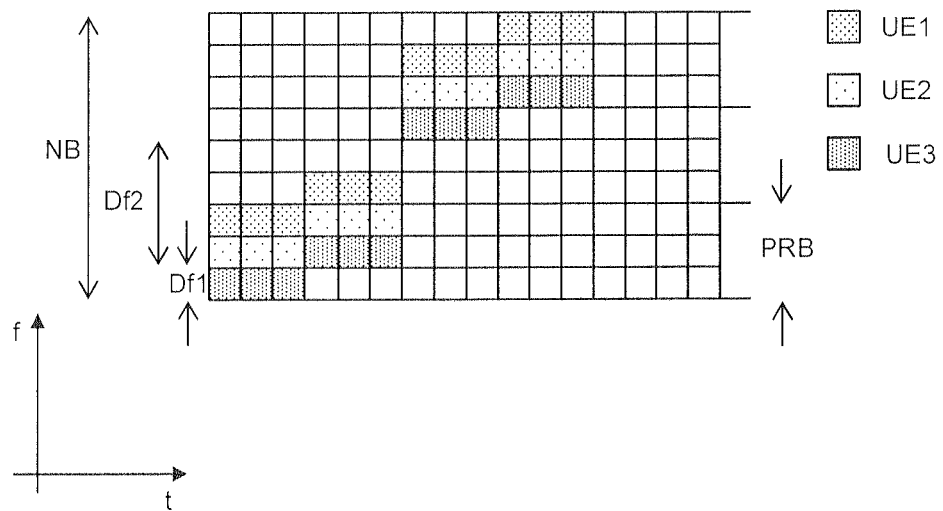
FIG. 9 schematically illustrates a further frequency hop pattern for UL positioning reference signals according to an embodiment of the invention.

It is noted that the two different frequency hop distances as explained in the example of FIG. 8 are merely exemplary, and that it would also be possible to utilize only one frequency hop distance or more than two frequency hop distances. In some scenarios, one or more frequency distances can also be defined in such a way that the frequency hop pattern defines frequencies which are within the same narrowband frequency range. A corresponding example is illustrated in FIG. 9. While this may provide less frequency diversity than in the example of FIG. 8, it may be beneficial if the radio interface of the UE 100 is limited to a specific narrowband frequency range. In the example of FIG. 9, both the first frequency hop distance Df1 and the second frequency hop distance Df2 are smaller than the maximum bandwidth supported by the radio interface.

The frequency hop pattern may also define a repetition of the UL positioning reference signals 20. For example, before a frequency hop, the UL positioning reference signals 20 can be repeated Y times. If wireless communication in the wireless communication is organized in subframes (like for example in the LTE radio access technology), the repetitions can be defined by defining that for Y subframes the UL positioning reference signals 10 are repeated on the same frequency before performing a frequency hop. After the frequency hop, the UL positioning reference signals 20 may be repeated for Y subframes (or another number of subframes) on another frequency. If the frequency hop pattern defines multiple different hop distances, such as the above-mentioned frequency hop distances Df1 and Df2, the number of repetitions can also be defined individually per frequency hop distance. For example, a subpattern based on the first frequency hop distance Df1 could be repeated Z times before a frequency hop of the second frequency hop distance Df2.

It is noted that the frequency hop pattern on the one hand provides the UE 100 with information on which frequency it should transmit the UL positioning reference signals 20 at a given time. The UE 100 may then tune its radio interface accordingly. On the other hand, the frequency hop pattern provides the base stations 200 with information on which frequency the UL positioning reference signals 20 from the UE 100 can be received at a given time. The serving base station 200 of the UE 100 may configure the neighboring base stations 200 accordingly, e.g., by sending corresponding configuration information.

It is noted that the allocation of radio resources for transmission of the UL positioning reference signals 20 as shown in FIGS. 8 and 9 is merely exemplary. The allocation of radio resources for transmission of the UL positioning reference signals 20 may be configured in various ways. This may be accomplished in a UE specific manner. Further, the allocation may also be reconfigured in a dynamic manner, e.g., to meet accuracy requirements for the positioning measurements based on the UL positioning reference signals 20.

Figure 10:
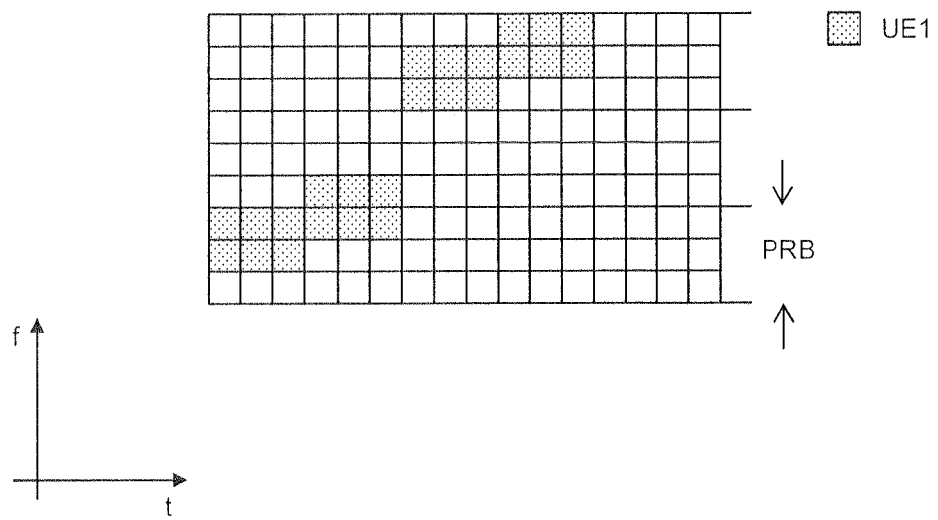
FIG. 10 schematically illustrates a further frequency hop pattern for UL positioning reference signals according to an embodiment of the invention.

For example, in some scenarios more radio resources may be allocated for transmission of the UL positioning reference signals 20 by transmitting the UL positioning reference signals 20 of the UE 100 over a larger frequency range, e.g., on more subcarriers. An example of a corresponding frequency hop pattern is illustrated in FIG. 10. As illustrated in FIG. 10, the frequency hop pattern for UE1 is similar as in the example of FIG. 9, but additional radio resources on other frequencies are used for transmission of the UL positioning reference signals 20.

Figure 11:
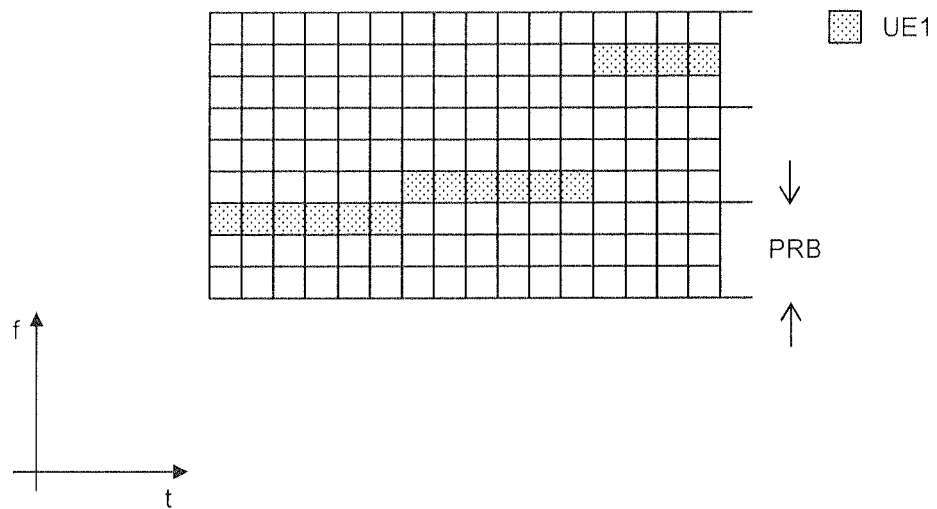
FIG. 11 schematically illustrates a further frequency hop pattern for UL positioning reference signals according to an embodiment of the invention.

According to a further example, in some scenarios more radio resources may be allocated for transmission of the UL positioning reference signals 20 by transmitting the UL positioning reference signals 20 of the UE 100 over a longer time interval, e.g., on more modulation symbols or in more subframes. An example of a corresponding frequency hop pattern is illustrated in FIG. 11. As illustrated in FIG. 11, the frequency hop pattern for UE1 is similar as in the example of FIG. 9, but additional radio resources in other time slots are used for transmission of the UL positioning reference signals 20. The additional time domain radio resources may be used for repetitive transmission of the UL positioning reference signal, e.g., according to a repetition pattern as mentioned above. Alternatively or in addition, the additional time domain radio resources may be used for transmitting the UL positioning reference signals on the basis of a longer symbol sequence.

Figure 12:
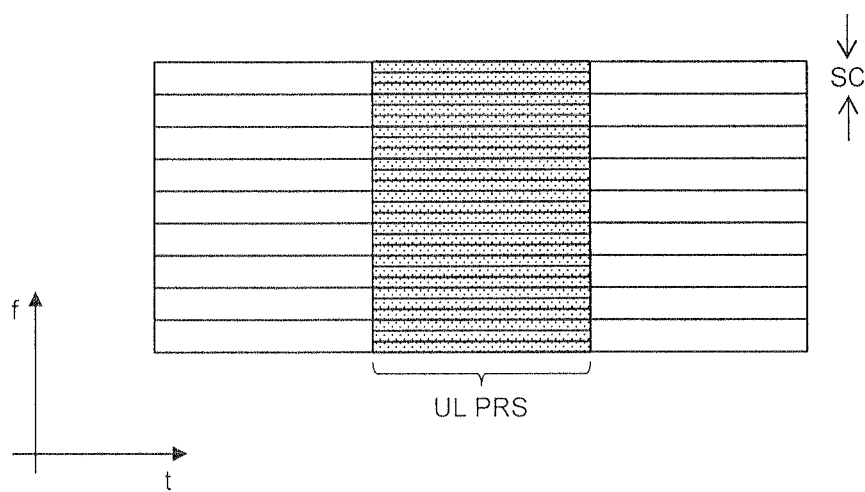
FIG. 12 schematically illustrates frequency division multiplexing for UL positioning reference signals according to an embodiment of the invention.

As mentioned above, frequency division multiplexing may be used for transmission of the UL positioning reference signals 20 of the different UEs. This frequency division multiplexing may be based on the same frequency granularity as used for multi-frequency modulation (e.g., OFDM or SC-FDMA) of wireless communication signals transmitted between the UE 100 and the base stations 200. By way of example, in the LTE radio access technology this frequency granularity would be defined by a subcarrier spacing of 15 kHz. In some scenarios, frequency division multiplexing of the UL positioning reference signals 20 may be based on a finer frequency granularity than the frequency granularity as used for multi-frequency modulation of the wireless communication signals. In this way, efficiency of frequency usage may be improved. An example of utilizing a finer frequency granularity for frequency division multiplexing of the UL positioning reference signals 20 is illustrated in FIG. 12. In FIG. 12, SC denotes a spacing of subcarriers as utilized for multi-frequency modulation of the wireless communication signals. For example, this may correspond to the 15 kHz subcarrier spacing as used for OFDM or SC-FDMA in the LTE radio access technology. As further illustrated, when transmitting the UL positioning reference signals 20, a finer frequency granularity, e.g., of less than 15 kHz, such as 3.75 kHz, is used for frequency division multiplexing of the UL positioning reference signals 20 of UEs. The UE 100 and the base stations 200 may switch to this finer frequency granularity in time intervals used for transmission of the UL positioning reference signals 20.

While in the above examples the UL positioning reference signals 20 are utilized for positioning measurements, other utilizations are possible as well. For example, one or more of the base stations 200 may utilize the UL positioning reference signals 24 for estimating channel quality and/or channel sounding for the UE 100.

Further, it is noted that measurements based on the above-mentioned DL positioning reference signals 10 and the above-mentioned UL positioning reference signals 20 may also be combined. For example, results obtained from both types of measurements may be reported to the location server and then be used in combination for determining the position of the UE 100.

Figure 13:
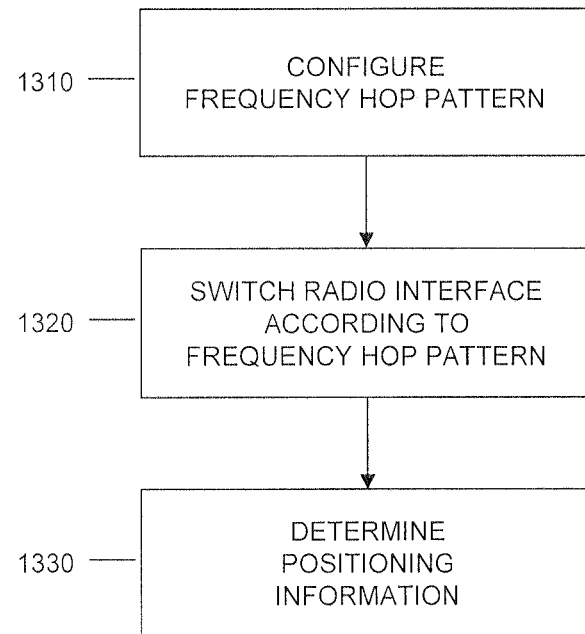
FIG. 13 shows a flowchart for illustrating a method according to an embodiment of the invention, which may be implemented by a wireless communication device.

FIG. 13 shows a flowchart illustrating a method which may be used for enabling positioning measurements for a wireless communication device, e.g., the above-mentioned UE 100, in a wireless communication network, e.g., a cellular network. By the method of FIG. 13 the wireless communication device, e.g., the above-mentioned UE 100, may implement the above described concepts involving positioning measurements based on DL positioning reference signals. If a processor based implementation of the wireless communication device is utilized, at least a part of the steps of the method may be performed and/or controlled by one or more processors of the wireless communication device.

At step 1310, a frequency hop pattern is configured. The frequency hop pattern is to be applied by the wireless communication device for receiving DL positioning reference signals from base stations of a wireless communication network, e.g., from the above-mentioned base stations 200. The DL positioning reference signals may for example correspond to the above-mentioned DL positioning reference signals 10. Examples of frequency hop patterns are illustrated in FIGS. 2, 3, 4, and 5.

The DL positioning reference signals transmitted by different base stations may be multiplexed on the basis of a multiplexing scheme comprising one or more of frequency division multiplexing, time division multiplexing, and code division multiplexing. In some scenarios, a frequency granularity for frequency division multiplexing of the DL positioning reference signals transmitted by different base stations may be finer than a frequency granularity for frequency division multiplexing of wireless communication signals transmitted between the wireless communication device and the wireless communication network, e.g., as explained in connection with FIG. 6. It is noted that when different base stations apply the same frequency hop pattern, the frequency division multiplexing may result in different frequencies for transmission of the DL positioning reference signals. In other words, the frequency hop pattern may be applied for offsetting a frequency division multiplexing pattern according to which the DL positioning reference signals from the different base stations are multiplexed.

The wireless communication device may configure the frequency hop pattern on the basis of configuration information received from the wireless communication network, e.g., from one of the base stations. For example, a serving base station of the wireless communication device could determine the frequency hop pattern and send corresponding configuration information to the wireless communication device. Further, a location server could determine the frequency hop pattern and send corresponding configuration information to the wireless communication device, e.g., via a serving base station of the wireless communication device. However, the frequency hop pattern could also be configured on the basis of information stored in the wireless communication device, e.g., as part of factory settings or operator settings. Further, in some cases the wireless communication network could also locally configure the frequency hop pattern and then indicate the frequency hop pattern to the wireless communication network, e.g., by sending corresponding configuration information to a base station of the wireless communication network.

In some scenarios, the frequency hop pattern may further define a repetition pattern of the DL positioning reference signals. In other words, the frequency hop pattern may then be defined in terms of a sequence of frequency hops and repetitions of the DL positioning reference signals between the frequency hops. The frequency hops may be based on the same frequency hop distance or on multiple different frequency hop distances.

At step 1320 the wireless communication device switches a radio interface of the wireless communication device between multiple different frequency ranges to receive the DL positioning reference signals on multiple different frequencies defined by the frequency hop pattern. This switching is accomplished according to the frequency hop pattern configured at step 1310. Accordingly, for each of the different frequencies, the wireless communication device may tune its radio interface to another frequency range. In this way, the DL positioning reference signals can be received with high accuracy. Further, frequency diversity of the DL positioning reference signals can be enhanced irrespective of bandwidth limitations of the radio interface of the wireless communication device.

At least some of the multiple different frequencies may be separated by more than a maximum bandwidth supported by the radio interface of the wireless communication device. In some scenarios, the frequency hop pattern may define a first frequency hop distance which is smaller than the maximum bandwidth supported by the radio interface and a second frequency hop distance, e.g., as explained in connection with FIG. 2.

At step 1330, the wireless communication device determines positioning information for the wireless communication device. This is accomplished by combined evaluation of the received DL positioning reference signals. In particular, positioning accuracy can be improved by considering DL positioning reference signals received on different frequencies. The positioning information may include a time-difference of arrival (TDOA) of the DL positioning reference signals from multiple different base stations. However, other kinds of positioning information could be determined as well, e.g., a time of arrival (TOA), an angle of arrival (AOA), and/or Doppler shift based information. When using an AOA, measurements on a single DL positioning reference signal could be sufficient to determine the position of the wireless communication device. In some scenarios, the positioning information could also include the position of the wireless communication device in absolute geographical coordinates or in coordinates relative to the base stations. The wireless communication device may then report the positioning information to a location server.

Figure 14:
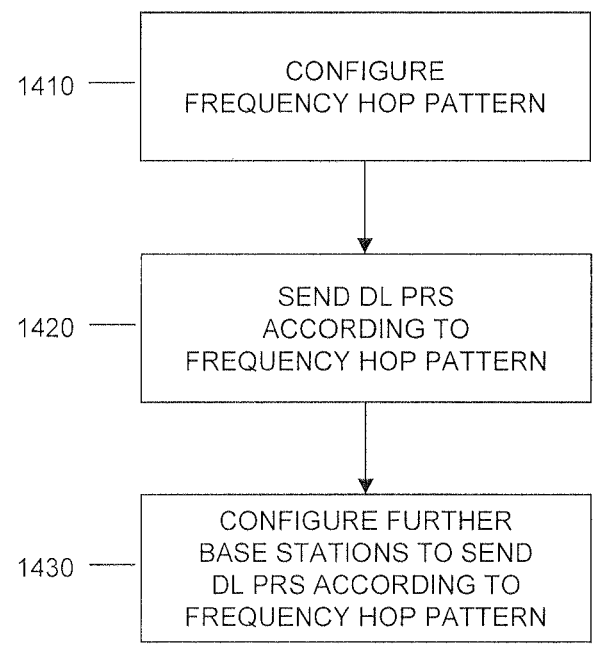
FIG. 14 shows a flowchart for illustrating a further method according to an embodiment of the invention, which may be implemented by a base station.

FIG. 14 shows a flowchart illustrating a method which may be used for enabling positioning measurements for a wireless communication device, e.g., the above-mentioned UE 100, in a wireless communication network, e.g., a cellular network. By the method of FIG. 14, a base station of the wireless communication network, e.g., the above-mentioned base station 200, may implement the above described concepts involving positioning measurements based on DL positioning reference signals. If a processor based implementation of the base station is utilized, at least a part of the steps of the method may be performed and/or controlled by one or more processors of the base station.

At step 1410, a frequency hop pattern is configured. The frequency hop pattern is to be applied by the wireless communication device for receiving DL positioning reference signals from base stations of a wireless communication network, e.g., from the above-mentioned base stations 200. The DL positioning reference signals may for example correspond to the above-mentioned DL positioning reference signals 10. Examples of frequency hop patterns are illustrated in FIGS. 2, 3, 4, and 5.

The DL positioning reference signals transmitted by different base stations may be multiplexed on the basis of a multiplexing scheme comprising one or more of frequency division multiplexing, time division multiplexing, and code division multiplexing. In some scenarios, a frequency granularity for frequency division multiplexing of the DL positioning reference signals transmitted by different base stations may be finer than a frequency granularity for frequency division multiplexing of wireless communication signals transmitted between the wireless communication device and the wireless communication network, e.g., as explained in connection with FIG. 6. It is noted that when different base stations apply the same frequency hop pattern, the frequency division multiplexing may result in different frequencies for transmission of the DL positioning reference signals. In other words, the frequency hop pattern may be applied for offsetting a frequency division multiplexing pattern according to which the DL positioning reference signals from the different base stations are multiplexed.

For configuring the frequency hop pattern, the base station may send configuration information indicating the frequency hop pattern to the wireless communication device.

However, in some cases the base station could, additionally or alternatively, also configure the frequency hop pattern based on configuration information received from the wireless communication device. For example, the wireless communication device could locally configure the frequency hop pattern and then indicate the frequency hop pattern by sending corresponding configuration information to the base station. Further, a location server could determine the frequency hop pattern and send corresponding configuration information to the base station.

In some scenarios, the frequency hop pattern may further define a repetition pattern of the DL positioning reference signals. In other words, the frequency hop pattern may then be defined in terms of a sequence of frequency hops and repetitions of the DL positioning reference signals between the frequency hops. The frequency hops may be based on the same frequency hop distance or on multiple different frequency hop distances.

At least some of the multiple different frequencies may be separated by more than a maximum bandwidth supported by the radio interface of the wireless communication device. In some scenarios, the frequency hop pattern may define a first frequency hop distance which is smaller than the maximum bandwidth supported by the radio interface and a second frequency hop distance which is larger than the maximum bandwidth supported by the radio interface, e.g., as explained in connection with FIG. 2.

At step 1420, the base station sends a first part of the DL positioning reference signals according to the frequency hop pattern. This may involve time dependent changing of the frequency on which the base station sends the DL positioning reference signals. However, the base station could also send the DL positioning reference signals simultaneously on the multiple different frequencies defined by the frequency hop pattern, e.g., on frequencies distributed over the entire system bandwidth of the wireless communication network or over a certain subrange within the system bandwidth of the wireless communication network.

At step 1430, the base station configures further base stations of the wireless communication network to send a second part of the DL positioning reference signals according to the frequency hop pattern. This may involve that the base stations sends configuration information indicating the frequency hop pattern to the further base stations. The further base stations may for example be neighboring base stations. Sending of the second part of the DL positioning reference signals by the further base stations may involve that each of the further base stations changes the frequency on which it sends the DL positioning reference signals in a time-dependent manner. However, the further base station could also send the DL positioning reference signals simultaneously on the multiple different frequencies defined by the frequency hop pattern, e.g., on frequencies distributed over the entire system bandwidth of the wireless communication network or over a certain subrange within the system bandwidth of the wireless communication network.

Figure 15:
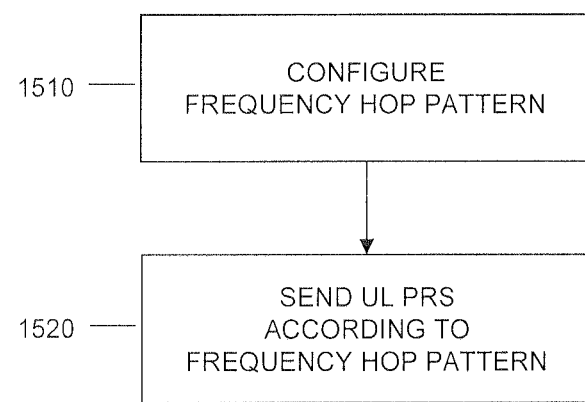
FIG. 15 shows a flowchart for illustrating a further method according to an embodiment of the invention, which may be implemented by a wireless communication device.

FIG. 15 shows a flowchart illustrating a method which may be used for enabling positioning measurements for a wireless communication device, e.g., the above-mentioned UE 100, in a wireless communication network, e.g., a cellular network. By the method of FIG. 15 the wireless communication device, e.g., the above-mentioned UE 100, may implement the above described concepts involving positioning measurements based on UL positioning reference signals. If a processor based implementation of the wireless communication device is utilized, at least a part of the steps of the method may be performed and/or controlled by one or more processors of the wireless communication device.

At step 1510, a frequency hop pattern is configured. The frequency hop pattern is to be applied for sending UL positioning reference signals from the wireless communication device. The UL positioning reference signals may for example correspond to the above-mentioned UL positioning reference signals 20. Examples of frequency hop patterns are illustrated in FIGS. 8, 9, 10, and 11.

The UL positioning reference signals transmitted by different wireless communication devices, i.e., by the wireless communication device and one or more further wireless communication devices, may be multiplexed on the basis of a multiplexing scheme comprising one or more of frequency division multiplexing, time division multiplexing, and code division multiplexing. In some scenarios, a frequency granularity for frequency division multiplexing of the UL positioning reference signals transmitted by different wireless communication devices may be finer than a frequency granularity for frequency division multiplexing of wireless communication signals transmitted between the wireless communication device and the wireless communication network, e.g., as explained in connection with FIG. 12. It is noted that when different wireless communication devices apply the same frequency hop pattern, the frequency division multiplexing may result in different frequencies for transmission of the respective UL positioning reference signals. In other words, the frequency hop pattern may be applied for offsetting a frequency division multiplexing pattern according to which the UL positioning reference signals from the different wireless communication devices are multiplexed.

The wireless communication device may configure the frequency hop pattern on the basis of configuration information received from the wireless communication network, e.g., from a base station of the wireless communication network. For example, a serving base station of the wireless communication device could determine the frequency hop pattern and send corresponding configuration information to the wireless communication device. Further, a location server could determine the frequency hop pattern and send corresponding configuration information to the wireless communication device, e.g., via a serving base station of the wireless communication device. However, the frequency hop pattern could also be configured on the basis of information stored in the wireless communication device, e.g., as part of factory settings or operator settings. Further, in some cases the wireless communication network could also locally configure the frequency hop pattern and then indicate the frequency hop pattern to the wireless communication network, e.g., by sending corresponding configuration information to a base station of the wireless communication network.

In some scenarios, the frequency hop pattern may further define a repetition pattern of the UL positioning reference signals. In other words, the frequency hop pattern may then be defined in terms of a sequence of frequency hops and repetitions of the UL positioning reference signals between the frequency hops. The frequency hops may be based on the same frequency hop distance or on multiple different frequency hop distances.

At step 1520, the wireless communication device switches a radio interface of the wireless communication device between multiple different frequency ranges to send the UL positioning reference signals on multiple different frequencies defined by the frequency hop pattern. This is accomplished according to the frequency hop pattern as configured at step 1510. Sending of the UL positioning reference signals by the wireless communication device may involve time dependent changing of the frequency on which the wireless communication device sends the UL positioning reference signals. Accordingly, for each of the different frequencies, the wireless communication device may tune its radio interface to another frequency range. In this way, the UL positioning reference signals can be transmitted with enhanced frequency diversity, irrespective of bandwidth limitations of the radio interface of the wireless communication device.

At least some of the multiple different frequencies may be separated by more than a maximum bandwidth supported by the radio interface of the wireless communication device. In some scenarios, the frequency hop pattern may define a first frequency hop distance which is smaller than the maximum bandwidth supported by the radio interface and a second frequency hop distance which is larger than the maximum bandwidth supported by the radio interface, e.g., as explained in connection with FIG. 8.

Figure 16:
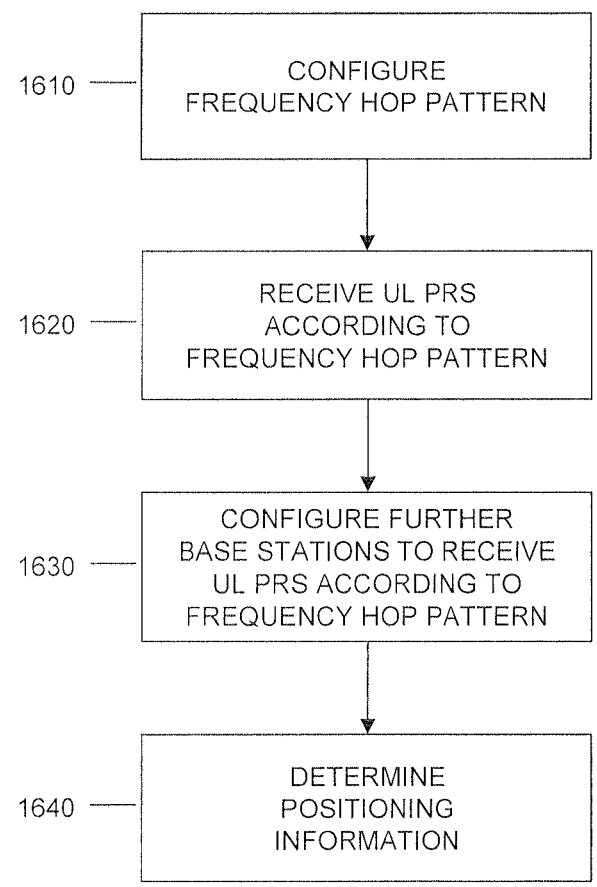
FIG. 16 shows a flowchart for illustrating a further method according to an embodiment of the invention, which may be implemented by a base station.

FIG. 16 shows a flowchart illustrating a method which may be used for enabling positioning measurements for a wireless communication device, e.g., the above-mentioned UE 100, in a wireless communication network, e.g., a cellular network. By the method of FIG. 16, a base station of the wireless communication network, e.g., the above-mentioned base station 200, may implement the above described concepts involving positioning measurements based on UL positioning reference signals. If a processor based implementation of the base station is utilized, at least a part of the steps of the method may be performed and/or controlled by one or more processors of the base station.

At step 1610, a frequency hop pattern is configured. The frequency hop pattern is to be applied for sending UL positioning reference signals from the wireless communication device. The UL positioning reference signals may for example correspond to the above-mentioned UL positioning reference signals 20. Examples of frequency hop patterns are illustrated in FIGS. 8, 9, 10, and 11.

The UL positioning reference signals transmitted by different wireless communication devices, i.e., by the wireless communication device and one or more further wireless communication devices, may be multiplexed on the basis of a multiplexing scheme comprising one or more of frequency division multiplexing, time division multiplexing, and code division multiplexing. In some scenarios, a frequency granularity for frequency division multiplexing of the UL positioning reference signals transmitted by different wireless communication devices may be finer than a frequency granularity for frequency division multiplexing of wireless communication signals transmitted between the wireless communication device and the wireless communication network, e.g., as explained in connection with FIG. 12. It is noted that when different wireless communication devices apply the same frequency hop pattern, the frequency division multiplexing may result in different frequencies for transmission of the respective UL positioning reference signals. In other words, the frequency hop pattern may be applied for offsetting a frequency division multiplexing pattern according to which the UL positioning reference signals from the different wireless communication devices are multiplexed.

For configuring the frequency hop pattern, the base station may send configuration information indicating the frequency hop pattern to the wireless communication device. However, in some cases the base station could also configure the frequency hop pattern based on configuration information received from the wireless communication device. For example, the wireless communication network could locally configure the frequency hop pattern and then indicate the frequency hop pattern by sending corresponding configuration information to the base station. Further, a location server could determine the frequency hop pattern and send corresponding configuration information to base station.

In some scenarios, the frequency hop pattern may further define a repetition pattern of the UL positioning reference signals. In other words, the frequency hop pattern may then be defined in terms of a sequence of frequency hops and repetitions of the UL positioning reference signals between the frequency hops. The frequency hops may be based on the same frequency hop distance or on multiple different frequency hop distances.

At step 1620, the base station receives the UL positioning reference signals from the wireless communication device. For this purpose, the base station may monitor the frequencies defined by the frequency hop pattern.

At step 1630, the base station configures further base stations of the wireless communication network to receive the UL positioning reference signals from the wireless communication device. This may involve that the base stations sends configuration information indicating the frequency hop pattern to the further base stations. The further base stations may for example be neighboring base stations. For receiving the UL positioning reference signals, each of the further base stations may monitor the frequencies defined by the frequency hop pattern. Further, the base station configures the further base stations to provide information derived from the received UL positioning reference signals to the base station, e.g., by requesting measurement reports.

At step 1640, the base station determines positioning information for the wireless communication device. This is accomplished by combined evaluation of the UL positioning reference signals received at step 1620 and the information provided by the further base stations. The positioning information may include a time-difference of arrival (TDOA) of the UL positioning reference signals between different base stations receiving the UL positioning reference signals. However, other kinds of positioning information could be determined as well, e.g., a time of arrival (TOA), an angle of arrival (AOA), and/or Doppler shift based information. When using an AOA, measurements on a single DL positioning reference signal could be sufficient to determine the position of the wireless communication device. In some scenarios, the positioning information could also include the position of the wireless communication device in absolute geographical coordinates or in coordinates relative to the base stations. The base station may then report the positioning information to a location server.

It is to be understood that the methods of FIGS. 13, 14, 15, and/or 16 may also be combined, e.g., in a system including at least one wireless communication device operating according to the method of FIG. 13 and at least one base station operating according to the method of FIG. 14, or in a system including at least one wireless communication device operating according to the method of FIG. 15 and at least one base station operating according to the method of FIG. 16. Further, the same wireless communication device could implement both the method of FIG. 13 and the method of FIG. 15, and/or the same base station could implement both the method of FIG. 14 and the method of FIG. 16.

Further, it is noted that the method steps of FIGS. 13, 14, 15, and/or 16 do not necessarily need to be performed in the illustrated order and that different order of the illustrated steps are possible or some of the illustrated steps could be performed in parallel. Further, individual actions or operations of different steps could be performed in an interleaved manner.

Figure 17:
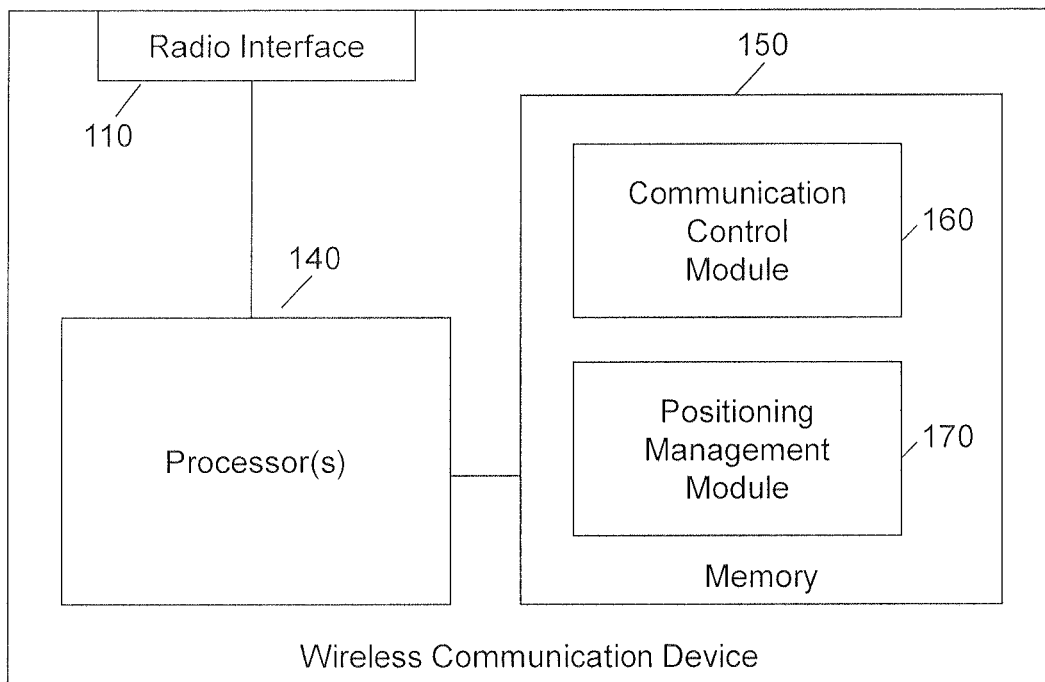
FIG. 17 schematically illustrates a processor-based implementation of a wireless communication device according to an embodiment of the invention.

FIG. 17 shows a block diagram for schematically illustrating a processor based implementation of a wireless communication device which may be utilized for implementing the above concepts. The wireless communication device may for example correspond to a UE, such as the above-mentioned UE 100.

As illustrated, the wireless communication device includes a radio interface 110. The wireless communication device may utilize the radio interface 110 for connecting to a wireless communication network, e.g., through a base station of the wireless communication network, such as one of the base stations 200.

Further, the wireless communication device is provided with one or more processors 140 and a memory 150. The radio interface 110 and the memory 150 are coupled to the processor(s) 140, e.g., using one or more internal bus systems of the wireless communication device.

The memory 150 includes program code modules 160, 170 with program code to be executed by the processor(s) 140. In the illustrated example, these program code modules include a communication control module 160 and a positioning management module 170.

The communication control module 160 may implement functionalities of controlling wireless transmissions between the wireless communication device and the wireless communication network. The positioning management module 170 may implement the above-described functionalities of utilizing a frequency hop pattern for enabling positioning measurements, e.g., according to the method of FIG. 13 and/or the method of FIG. 15.

It is to be understood that the structures as illustrated in FIG. 17 are merely exemplary and that the wireless communication device may also include other elements which have not been illustrated, e.g., structures or program code modules for implementing known functionalities of a UE or other type of wireless communication device.

Figure 18:
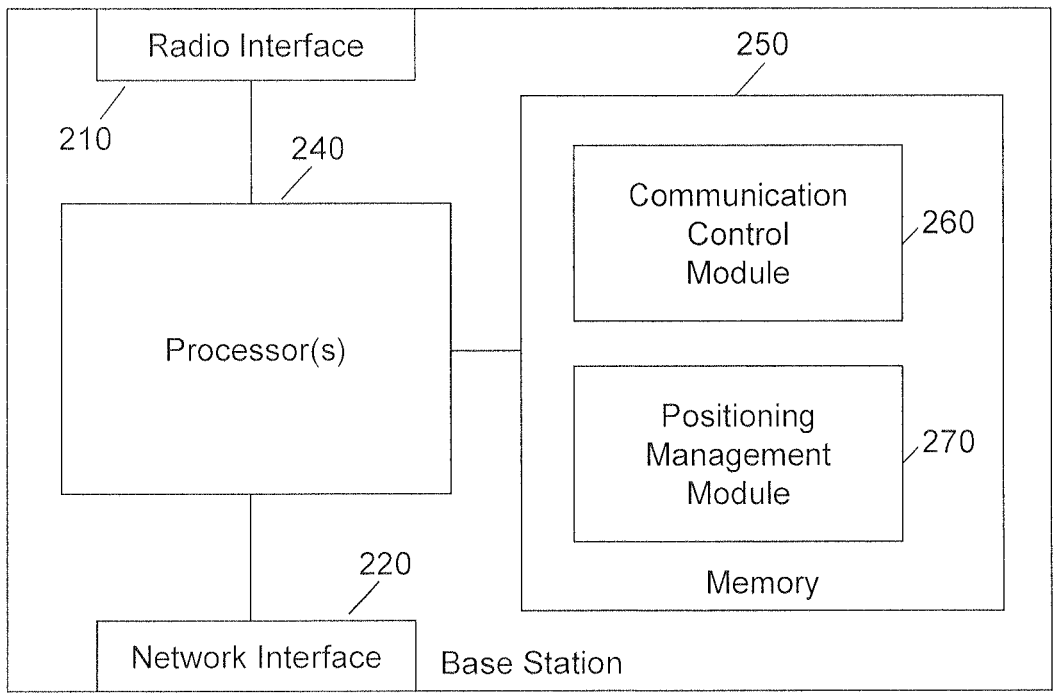
FIG. 18 schematically illustrates a processor-based implementation of a base station according to an embodiment of the invention.

FIG. 18 shows a block diagram for schematically illustrating a processor based implementation of a base station which may be utilized for implementing the above concepts. The base station may for example correspond to one of the above-mentioned base stations 200.

As illustrated, the base station includes a radio interface 210. The base station may utilize the radio interface 210 for connecting to at least one wireless communication device, e.g., a UE such as the UE 100. Further, the base station includes a network interface 220. The base station may utilize the network interface 220 for connecting to other nodes of the wireless communication network, in particular to other base stations.

Further, the base station is provided with one or more processors 240 and a memory 250. The radio interface 210, the network interface 220, and the memory 250 are coupled to the processor(s) 240, e.g., using one or more internal bus systems of the base station.

The memory 250 includes program code modules 260, 270 with program code to be executed by the processor(s) 240. In the illustrated example, these program code modules include a communication control module 260 and a positioning management module 270.

The communication control module 260 may implement functionalities of controlling wireless transmissions between a wireless communication device and the wireless communication network. The positioning management module 270 may implement the above-described functionalities of utilizing a frequency hop pattern for enabling positioning measurements, e.g., according to the method of FIG. 14 and/or the method of FIG. 16.

It is to be understood that the structures as illustrated in FIG. 18 are merely exemplary and that the base station may also include other elements which have not been illustrated, e.g., structures or program code modules for implementing known functionalities of a base station.

It is to be understood that the concepts as explained above are susceptible to various modifications. For example, the concepts could be applied in connection with various kinds of wireless communication technologies and devices. Further, the concepts may be applied in connection with various types of algorithms for evaluating the DL positioning reference signals and/or UL positioning reference signals.

The invention claimed is:

1. A method of enabling position measurement for a wireless communication device, the method comprising:
    configuring a frequency hop pattern to be applied for switching a radio interface of the wireless communication device between multiple different frequency ranges to receive or send positioning reference signals on multiple different frequencies defined by the frequency hop pattern,
    wherein the frequency hopping pattern is defined by at least a first frequency hop distance that is smaller than a second frequency hop distance such that at least some of the multiple different frequencies are separated by more than a maximum bandwidth supported by the radio interface of the wireless communication device.

2. The method according to claim 1,
    wherein the wireless communication device configures the frequency hop pattern on the basis of configuration information received from the wireless communication network.

3. The method according to claim 1,
    wherein the first frequency hop distance is smaller than the maximum bandwidth supported by the radio interface and the second frequency hop distance is larger than the maximum bandwidth supported by the radio interface.

4. The method according to claim 1,
    wherein the frequency hop pattern further defines a repetition pattern of the positioning reference signals.

5. The method according to claim 1,
    wherein positioning reference signals associated with different base stations are multiplexed on the basis of a frequency multiplexing scheme.

6. The method according to claim 5,
    wherein a frequency granularity for frequency division multiplexing of the positioning reference signals is finer than a frequency granularity for frequency division multiplexing of wireless communication signals transmitted between the wireless communication device and the wireless communication network.

7. The method according to claim 5,
    wherein the multiplexing scheme comprises one or more of frequency division multiplexing, time division multiplexing, and code division multiplexing.

8. The method according to claim 5,
    wherein uplink positioning reference signals and further uplink positioning reference signals transmitted by one or more other wireless communication devices are multiplexed on the basis of a multiplexing scheme comprising one or more of frequency division multiplexing, time division multiplexing, and code division multiplexing.

9. The method according to claim 8,
wherein a frequency granularity for frequency division multiplexing of the uplink positioning reference signals and further uplink positioning reference signals transmitted by further wireless communication devices is finer than a frequency granularity for frequency division multiplexing of wireless communication signals transmitted between the wireless communication device and the wireless communication network.

10. The method according to claim 1, further comprising:
according to the frequency hop pattern, the wireless communication device switching the radio interface of the wireless communication device between the multiple different frequency ranges to receive or send the positioning reference signals on the multiple different frequencies defined by the frequency hop pattern.

11. The method according to claim 1,
wherein the positioning reference signals comprise downlink positioning reference signals and the method further comprises:
a base station of the wireless communication network sending a first part of the downlink positioning reference signals according to the frequency hop pattern; and
the base station configuring further base stations of the wireless communication network to send a second part of the downlink positioning reference signals according to the frequency hop pattern.

12. The method according to claim 11,
wherein the base station sends configuration information indicating the frequency hop pattern to the wireless communication device.

13. The method according to claim 11,
wherein the base station sends configuration information indicating the frequency hop pattern to the further base stations.

14. The method according to claim 1,
wherein the positioning reference signals comprise downlink positioning reference signals and by combined evaluation of the received positioning reference signals received by the wireless communication device, the wireless communication device determines positioning information for the wireless communication device.

15. The method according to claim 1,
wherein the positioning information comprises a time-difference of arrival of the downlink positioning reference signals from multiple different base stations.

16. The method according to claim 1,
wherein the positioning reference signals comprise uplink reference signals and the method further comprises:
a base station of the wireless communication network receiving the uplink positioning reference signals from the wire-less communication device;
the base station configuring further base stations of the wireless communication network to receive the uplink positioning reference signals from the wireless communication device and provide information derived from the received uplink positioning reference signals to the base station; and
by combined evaluation of the received uplink positioning reference signals and the information provided by the further base stations, the base station determining positioning information for the wireless communication device.

17. The method according to claim 16,
wherein the positioning information comprises a time-difference of arrival of the uplink positioning reference signals at multiple different base stations.

18. A wireless communication device, comprising:
a radio interface for connecting to a wireless communication network; and
at least one processor,
the at least one processor being configured to:
configure a frequency hop pattern to be applied for switching a radio interface of the wireless communication device between multiple different frequency ranges to receive or send positioning reference signals on multiple different frequencies defined by the frequency hop pattern,
wherein the frequency hopping pattern is defined by at least a first frequency hop distance that is smaller than a second frequency hop distance such that at least some of the multiple different frequencies are separated by more than a maximum bandwidth supported by the radio interface of the wireless communication device.

19. A base station for a wireless communication network, the base station comprising:
a radio interface for connecting to a wireless communication device;
a network interface for connecting to further base stations of the wireless communication network; and
at least one processor,
the at least one processor being configured to:
configure a frequency hop pattern to be applied for switching a radio interface of the wireless communication device between multiple different frequency ranges to receive or send positioning reference signals on multiple different frequencies defined by the frequency hop pattern;
wherein the frequency hopping pattern is defined by at least a first frequency hop distance that is smaller than a second frequency hop distance such that at least some of the multiple different frequencies are separated by more than a maximum bandwidth supported by the radio interface of the wireless communication device.

20. A system, comprising:
a base station according to claim 19; and
the wireless communication device.

* * * * *